United States Patent [19]

Whisenhunt et al.

[11] Patent Number: 5,635,227
[45] Date of Patent: Jun. 3, 1997

[54] REPLACEABLE AIR CYLINDER UNIT AND VALVE GATE FOR INJECTION MOLDING MACHINES

[75] Inventors: James A. Whisenhunt, Independence; Brian R. Lefebure, Lee's Summit, both of Mo.

[73] Assignee: R & D Tool and Engineering, Inc., Lee's Summit, Mo.

[21] Appl. No.: 471,821

[22] Filed: Jun. 7, 1995

[51] Int. Cl.$^6$ .................................................. B29C 45/23
[52] U.S. Cl. ...................... 425/562; 264/328.9; 425/564; 425/566
[58] Field of Search ...................... 425/562, 564, 425/566; 264/328.9

[56] References Cited

U.S. PATENT DOCUMENTS

| | | |
|---|---|---|
| 2,770,011 | 11/1956 | Kelly . |
| 2,773,284 | 12/1956 | Kelly . |
| 3,037,245 | 6/1962 | Darnell .................... 425/562 |
| 3,052,925 | 9/1962 | Bronnenkant et al. . |
| 4,013,393 | 3/1977 | Gellert . |
| 4,125,352 | 11/1978 | Gellert . |
| 4,140,464 | 2/1979 | Spurr et al. . |
| 4,173,448 | 11/1979 | Rees et al. . |
| 4,209,290 | 6/1980 | Rees et al. . |
| 4,213,751 | 7/1980 | Fernandez . |
| 4,222,733 | 9/1980 | Gellert et al. . |
| 4,259,056 | 3/1981 | Rees et al. . |
| 4,268,240 | 5/1981 | Rees et al. . |
| 4,286,941 | 9/1981 | Gellert . |
| 4,521,179 | 6/1985 | Gellert . |
| 4,530,654 | 7/1985 | Rose . |
| 4,588,367 | 5/1986 | Schad . |
| 4,662,837 | 5/1987 | Anderson . |
| 4,682,945 | 7/1987 | Schad . |
| 4,705,473 | 11/1987 | Schmidt . |
| 4,712,995 | 12/1987 | Basnett . |
| 4,729,733 | 3/1988 | Schmidt . |
| 4,740,151 | 4/1988 | Schmidt et al. . |
| 4,747,770 | 5/1988 | Schmidt . |
| 4,752,207 | 6/1988 | Kaaden . |
| 4,755,131 | 7/1988 | Schmidt . |
| 4,756,683 | 7/1988 | Svoboda . |
| 4,787,840 | 11/1988 | Gellert . |
| 4,793,794 | 12/1988 | Kaaden . |
| 4,793,795 | 12/1988 | Schmidt et al. . |
| 4,919,606 | 4/1990 | Gellert . |
| 4,923,387 | 5/1990 | Gellert . |
| 4,975,038 | 12/1990 | Delalande . |
| 4,979,892 | 12/1990 | Gellert . |
| 5,028,225 | 7/1991 | De'ath et al. . |
| 5,039,293 | 8/1991 | Knipp et al. . |
| 5,106,291 | 4/1992 | Gellert . |
| 5,200,208 | 4/1993 | Cohen et al. . |
| 5,215,762 | 6/1993 | Eder et al. . |

*Primary Examiner*—Tim Heitbrink
*Attorney, Agent, or Firm*—Hovey, Williams, Timmons & Collins

[57] ABSTRACT

A mold assembly is provided for use in an injection molding machine and includes a cavity plate defining a cavity adapted to receive a moldable material, and a manifold positioned behind the cavity plate. The manifold includes a passageway for guiding the flow of the moldable material to the cavity plate. A support plate is positioned adjacent the manifold and includes a rear face into which a cup shaped recess extends, a front face opposite the rear face, and a bore extending between the front face and the recess. A nozzle is provided between the passageway in the manifold and the cavity in the plate for directing the flow of material into the cavity, and a valve gate pin extends into the nozzle. The valve gate pin is movable between a forward flow-blocking position and a rearward flow-permitting position, and a cylinder unit moves the valve gate pin between these positions. The actuator includes a drop-in pneumatic actuator secured within the recess of the support plate. The actuator includes a body presenting a front closed end and a rear open end, a movable piston extending through the closed end of the cylinder and being connected to the piston. A cap closes off the open end of the cylinder, and threaded fasteners are provided for holding the cap and cylinder together as a unit. Threaded fasteners are also provided for securing the actuator within the recess of the support plate so that the actuator can be dropped into the recess and secured in place or pulled from the recess as an assembled unit.

14 Claims, 3 Drawing Sheets

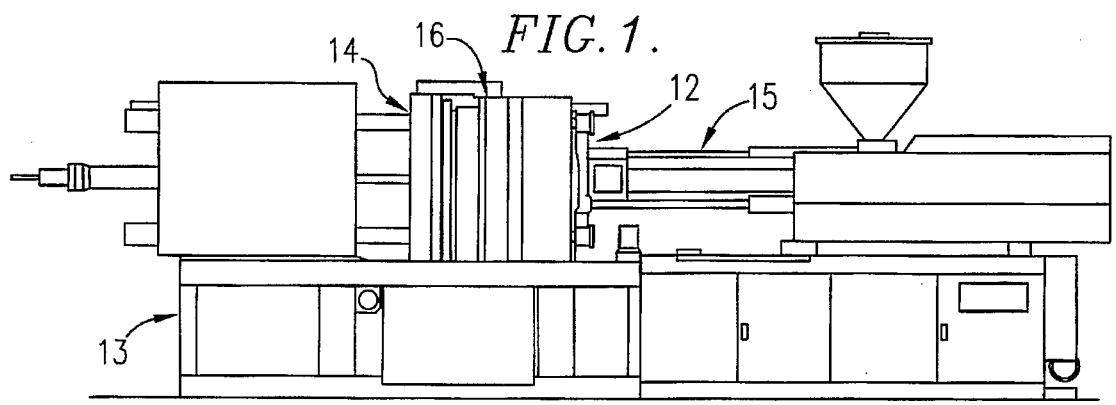
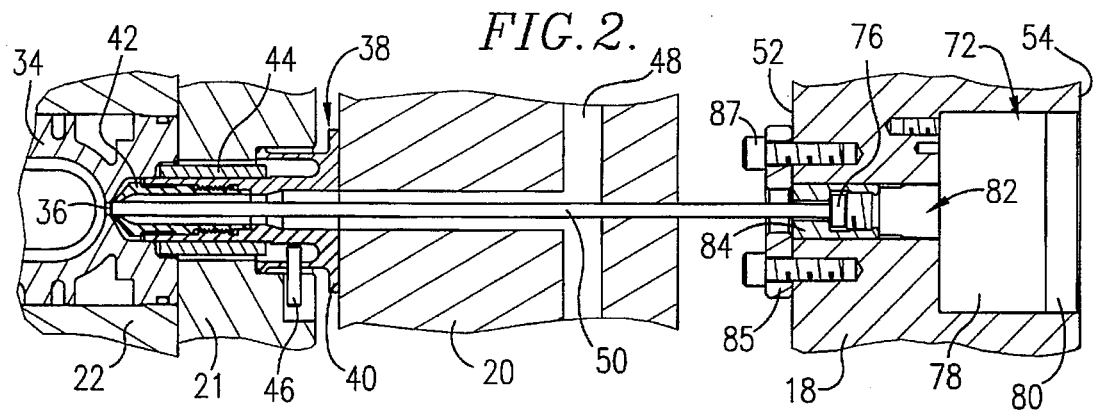
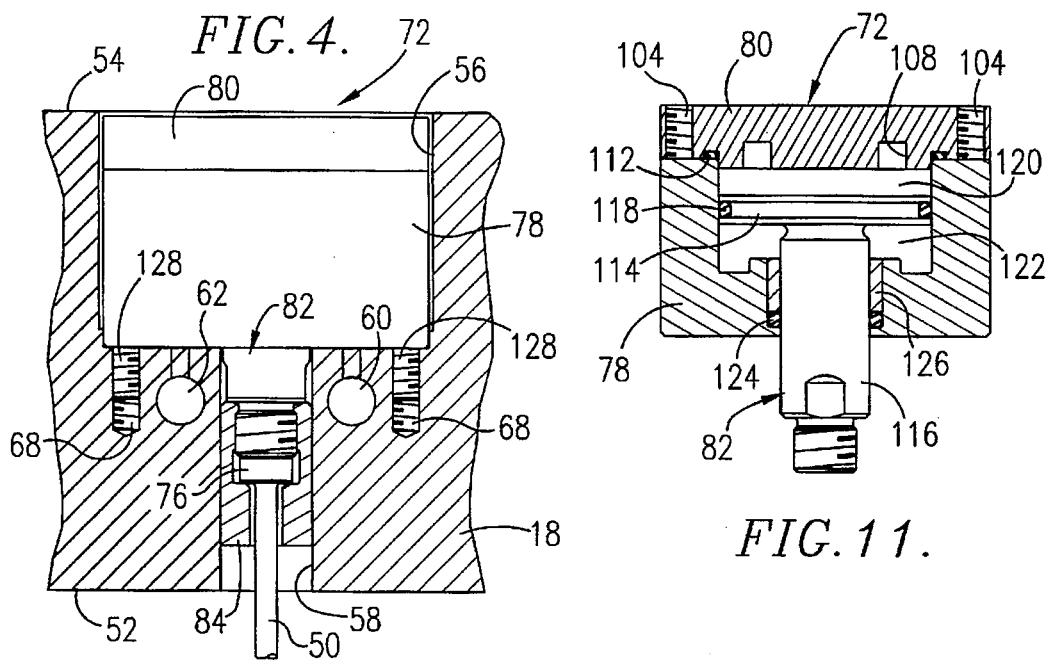

5,635,227

REPLACEABLE AIR CYLINDER UNIT AND VALVE GATE FOR INJECTION MOLDING MACHINES

BACKGROUND OF THE INVENTION

1. Field of the Invention

The present invention relates generally to injection molding and, more particularly, to a mold assembly for use in an injection molding machine, wherein the mold assembly incorporates one or more valve gates having replaceable, drop-in actuators.

2. Discussion of the Prior Art

Injection molding machines are known which include a base on which a pair of relatively movable platens are supported. Typically, one of the platens is fixed on the base while the other is movable back and forth relative to the fixed platen. An example of an injection molding machine of this general type is marketed under the trademark TM-300G™ by Toyo Machinery & Metal Co., Ltd., and includes an extruder positioned in line with the fixed platen for supplying moldable material to a mold assembly positioned between the platens. The extruder includes an outlet nozzle extending through the fixed platen so that material supplied by the extruder can be directed into the mold assembly.

Conventionally, a mold assembly adapted for use in this known type of molding machine includes a cavity plate presenting several mold cavities, and a core plate presenting a similar number of cores aligned with the cavities. The cavity plate is typically secured to the fixed platen of the machine along with a manifold housing that includes a manifold for directing the moldable material from the extruder into each of the cavities of the cavity plate. The core plate is secured to the movable platen so that it can be pulled away from the cavity plate upon completion of molding to remove the molded parts from the cavities, and a knockout means is provided for then releasing the molded parts from the cores. In addition, separable thread splits can be provided that are also carried along with the core plate and cooperate with one another and the cavities to define the outer shape of the part to be molded.

In order to control the flow of moldable material into the cavities of the mold assembly, it is known to provide a nozzle at the inlet to each cavity in the cavity plate, and a valve gate at each nozzle for controlling the flow of moldable material from the nozzle. Each valve gate includes an elongated stem extending into the mouth of one of the nozzles and being movable between flow-blocking and flow-permitting positions. An actuator is also provided in association with each valve gate for moving the valve gate between these positions, and typically includes a fluid actuated actuator or the like.

An example of a known valve gate mechanism includes a fluid motor comprised of a cylinder that is removably seated in a bore of a clamp plate that is spaced from the mold manifold. A piston is mounted in the cylinder and includes a stepped bore in which the valve gate stem is retained. The piston also includes a guide portion that extends from the bore toward the manifold through a guide member that is sandwiched within the bore between the cylinder and the clamp plate. The clamp plate is formed with a pair of passageways that are adapted to align with ports formed in the cylinder on either side of the piston so that fluid can be supplied to the cylinder in order to reciprocate the piston back and forth, actuating the valve gate. One of the passageways communicates with the cylinder through a hole in the cylinder wall while the other passageway connects with a hole in the guide member. Annular seals extend around the cylinder above and below the hole in the cylinder wall for sealing the space between the cylinder and the clamp plate, and an additional seal is provided between the guide member and the clamp plate for sealing the space therebetween.

Numerous problems arise in the use of mold assemblies incorporating conventional valve gate actuator constructions. For example, known actuators are formed of several parts that must be assembled on the clamp plate within each bore, and it is not possible to test the actuators for a good seal until all of them have been assembled and actuated at the operating temperature of the mold assembly. Thus, in a 32-cavity mold assembly, it is necessary to assemble all 32 actuators before any one of them can be tested to determine the operability thereof. This represents a significant investment of both time and effort during assembly of the mold and fails to provide immediate confirmation to the operator that each actuator has been properly assembled.

If during the life of the mold assembly a seal goes bad or it is necessary to replace any other component of an actuator, it is necessary in the conventional construction to disassemble the bad actuators from the clamp plate, repair or replace the bad components, and then reassemble the actuator in the clamp plate. During this process, the entire mold assembly remains out of service, representing potentially expensive down time for the machine. Further, it is not possible to test the repaired or replaced components of the actuator until the components are reassembled in the clamp plate and tested at molding temperature. Thus, if one or more of actuators are not properly sealed, it is necessary to repeat the mentioned process until proper operation is achieved.

OBJECTS AND SUMMARY OF THE INVENTION

It is an object of the present invention to provide a mold assembly incorporating removable cylinder units for actuating the valve gates of the assembly, wherein the units can be dropped in or pulled from the mold assembly without requiring that the units first be broken down in order to be removed piece-by-piece.

It is another object of the invention to provide a mold assembly in which the cylinder units are spaced from the manifold and nozzles, both of which are conventionally heated, in order to avoid exposing the cylinder units to elevated temperatures that would effect the life of the units. In addition, the invention seeks to permit quick change out of any inoperative or worn out units without requiring significant down time. Further, by providing a cylinder unit construction that is capable of being completely assembled prior to installation on the mold assembly, the units can be tested for a proper seal before being dropped into the mold assembly for use. In this manner, it is possible to reduce the down time further by simplifying the replacement operation and by permitting prior verification that the replacement units are properly assembled.

In accordance with these and other objects evident from the following description of a preferred embodiment of the invention, a mold assembly is provided for use on an injection molding machine. The assembly includes a cavity plate defining a cavity adapted to receive the moldable material, and a manifold housing interposed between the cavity plate and a platen of the machine. The manifold housing includes a passageway for guiding the flow of the moldable material to the cavity plate. A support plate is positioned adjacent the manifold and includes a rear face remote from the manifold into which a cup shaped recess extends and a front face opposite the rear face. A bore extends between the front face and the recess.

A nozzle is provided between the manifold passageway and the cavity in the plate for directing the flow of material into the cavity, and a valve gate extends into the nozzle for controlling the flow of material from the nozzle. The valve gate is movable between a forward flow-blocking position and a rearward flow-permitting position, and an actuating means is provided for moving the valve gate between these positions. The actuating means includes a pneumatic actuator secured within the recess of the support plate. The actuator includes a cylinder body presenting a front closed end and a rear open end, a piston supported for movement within the cylinder and extending through the closed end of the cylinder, and a cap closing off the open end of the cylinder. The valve pin is connected to the piston, and a removable holding means is provided for holding the cap and cylinder together as a unit. In addition, a removable securing means secures the actuator within the recess of the support plate so that the actuator can be dropped into the recess and secured in place or pulled from the recess as an assembled unit.

By providing a construction in accordance with the present invention, numerous advantages are realized. For example, by providing a actuator having a body, piston and cap that can be assembled prior to positioning on the support plate, the units can be dropped in or pulled from the mold assembly without requiring that the units first be broken down in order to be removed piece-by-piece.

Another advantage obtained by employing the present invention resides in providing a cylinder unit construction that is capable of being tested for proper function before being installed into the mold assembly for use. Thus, the mold assembly need not be out of service for any longer time than is necessary to pull any bad units from the support plate and replace them with previously tested good ones.

A further advantage of the present construction is realized by the use of a water-cooled support plate that acts as a thermal barrier, preventing heat migration to the cylinder units.

BRIEF DESCRIPTION OF THE DRAWING FIGURES

The preferred embodiment of the invention is described in detail below with reference to the attached drawing figures, wherein:

FIG. 1 is a side elevational view of an injection molding machine provided with a replaceable air cylinder unit and valve gate constructed in accordance with the preferred embodiment;

FIG. 2 is a fragmentary sectional view of the cylinder unit and valve gate;

FIG. 4 is a fragmentary sectional view of a top clamp plate of the mold assembly, illustrating the cylinder unit;

FIG. 11 is a sectional view taken along line 11—11 of FIG. 5.

DETAILED DESCRIPTION OF A PREFERRED EMBODIMENT

Figure 3:
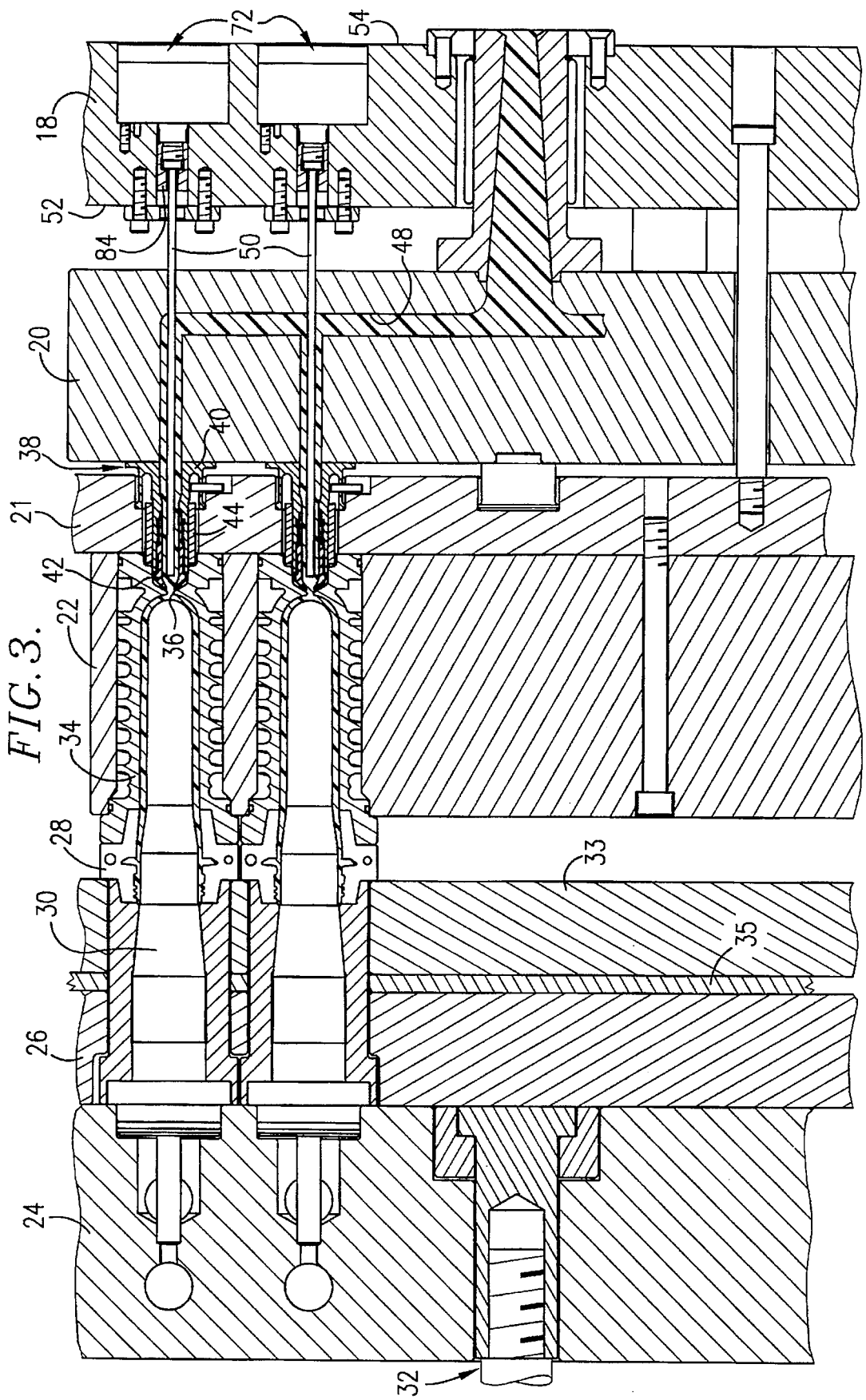
FIG. 3 is a fragmentary sectional view of a mold assembly incorporating the cylinder unit and valve gate.

A conventional injection molding machine is illustrated in FIG. 1, and broadly includes a base 13 on which a fixed platen 12 and movable platen 14 are supported. An extruder 15 is also supported on the base for preparing the material to be molded, and includes an outlet nozzle extending through the fixed platen so that material supplied by the extruder can be directed to a mold assembly 16 positioned between the platens. An example of an injection molding machine of this general type is marketed under the trademark TM-300G™ by Toyo Machinery & Metal Co., Ltd.

The injection molding machine is designed to receive any of a number of different types of conventional mold assemblies, but is illustrated in FIG. 1 with a mold assembly 16 constructed in accordance with the preferred embodiment of the present invention. The preferred mold assembly 16 includes several components, some of which are supported on the fixed platen and others of which are supported on the movable platen 14. Specifically, as shown in FIG. 3, the fixed platen supports a top clamp or support plate 18, a manifold 20, a manifold backing plate 21 and a cavity plate 22, while a core plate 24, stripper plate 26 and thread splits 28 are supported on the movable platen.

The core plate 24 is preferably clamped to the movable platen by toe clamps or the like, and provides a support for one or more mold cores 30 sized for receipt in the cavity plate to define the interior shape of a part to be molded. For example, if the mold assembly is constructed to permit the simultaneous molding of 32 separate parts, cores are provided on the core plate in association with each part, and cooperate with the cavity plate to define the shape of the parts. A knockout assembly 32 is also provided, and extends through the core plate. The function of the knockout assembly is to separate the thread splits from one another subsequent to molding and to push the molded parts from the cores so that the parts can be removed from the machine.

The thread splits 28 are supported on thread slides 33 which, in turn, ride on a bearing plate 35 fastened to the stripper plate 26, and cooperate with the cavity plate to define the outer shape of the molded parts. A pair of thread splits are provided for each separate part to be molded, and are separated from one another upon completion of a molding operation to release the molded part from the assembly. Preferably, this separation is achieved by the knockout assembly 32 which moves the stripper plate 26 and thread splits 28 away from the core plate 24 while pushing the thread splits associated with each molded part away from one another. In this manner, each molded part is pushed from the associated core while being released from between the two thread splits surrounding the part.

On the other side of the mold assembly, the top clamp plate 18 is clamped to the fixed platen by toe clamps or the like, and the manifold 20, backing plate 21 and cavity plate 22 are secured to the top clamp plate by suitable fasteners. The cavity plate 22 is provided with a plurality of bores extending through the plate, wherein each bore is sized for receipt of a mold cavity 34. Each mold cavity presents an inner surface that defines the outer shape of the part to be molded, and a recess formed in an end of the cavity for receiving a nozzle 38, as shown in FIG. 2. An opening 36 extends into the cavity from the recess to provide a flow path for moldable material during molding.

The manifold 20 and backing plate 21 are spaced from one another, but both are supported on a manifold housing that maintains alignment of the manifold and backing plate during use of the mold assembly. In addition, the manifold is heated to facilitate movement of the moldable material to the cavities. A plurality of bores extend through the backing plate and are aligned with the openings 36 in the cavities. The nozzles 38 are supported in the bores, and each nozzle includes a generally cylindrical housing 40 within which an axially adjustable tip 42 is received. In addition, a heater 44 can be provided in association with each nozzle for maintaining the temperature of the moldable material elevated prior to being supplied to the cavity. A dowel extends between the backing plate 21 and each nozzle housing for holding the nozzle in place and for permitting replacement of the nozzle when necessary.

Returning to FIG. 3, the manifold 20 includes a manifold passage 48 that provides fluid communication between the extruder outlet and each of the nozzles 38. A reduced diameter bore extends through the manifold 20 into each branch line in alignment with the associated nozzle, and is adapted to receive a valve gate pin 50 that is used to control the flow of material from the nozzle.

Figure 9:
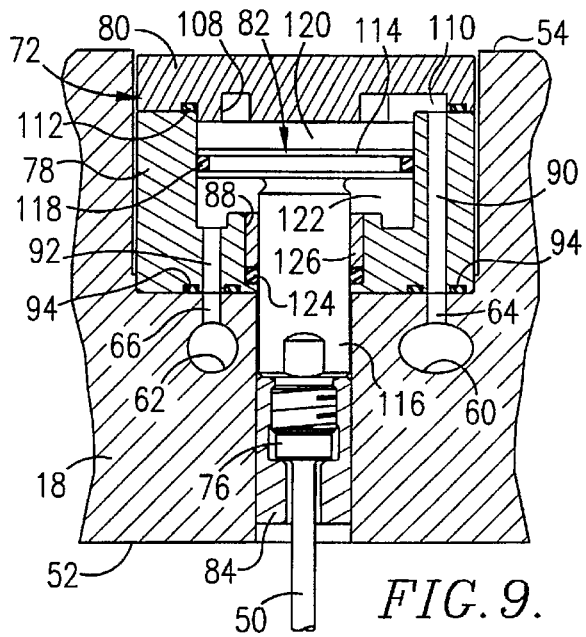
FIG. 9 is a sectional view taken along line 9—9 of FIG. 8.
Figure 6:
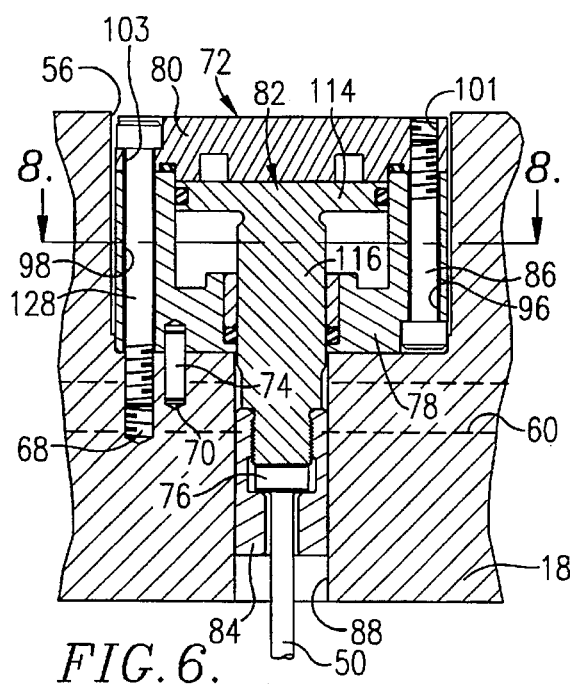
FIG. 6 is a sectional view taken along line 6—6 of FIG. 5.
Figure 8:
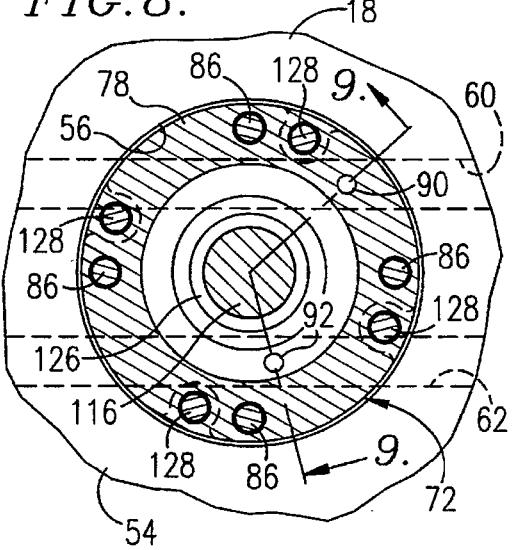
FIG. 8 is a sectional view taken along line 8—8 of FIG. 6.

The top clamp plate 18 is also received within the manifold housing, but is spaced from the manifold 20 by a distance sufficient to insulate the clamp plate from the elevated temperatures experienced in the manifold during molding. The plate 18 presents a front face 52 adjacent the manifold and a rear face 54 that faces the fixed platen when assembled on the molding machine. As illustrated in FIG. 4, a plurality of cup-shaped recesses 56 extend inward from the rear face of the clamp plate in alignment with the nozzles in the backing plate, and a bore 58 provides communication between each recess and the front face of the clamp plate. A pair of passageways 60, 62 extend through the clamp plate in a direction generally parallel to the faces 52, 54 for supplying air to each recess in the plate. Ports 64, 66 extend between each recess and the passageways 60, 62 to provide fluid communication therebetween, as shown in FIG. 9. If a single row or column of recesses are provided in the clamp plate then only two passageways are used, each communicating with every recess. However, if several rows of recesses are provided, separate passageways may be formed in the clamp plate to provide air to each row of recesses. Returning to FIG. 4, four threaded holes 68 are tapped into the bottom face of each recess for receiving a valve gate actuator 72, and an additional locating hole 70, illustrated in FIG. 6, is formed in the bottom face for receiving a locating pin 74 of the actuator.

As shown in FIG. 2, the valve gate pin 50 associated with each nozzle 38 includes a front end that extends into the nozzle and is of a diameter sufficient to block the flow of material through the opening 36 when moved into the tip of the nozzle. Each valve gate pin also includes an elongated stem that extends out the rear of the nozzle through manifold, and a rear end presenting a head 76 that is secured to the actuator 72.

A separate actuator is provided for each valve gate pin 50, and functions to reciprocate the valve gate pin back and forth between a forward flow-blocking position and a rearward flow-permitting position. Turning to FIG. 6, each actuator 72 includes a body 78, cap 80, piston 82 and a retainer 84 that are all held together by suitable fasteners 86 as a unit and supported in one of the recesses 56 of the top clamp plate 18.

The body 78 is generally cup-shaped, presenting a tubular side wall and a closed front wall adapted to rest against the bottom wall of the recess 56 when the actuator is positioned for use. The body is open at the rear end opposite the front wall, allowing access to the interior of the body. As illustrated in FIG. 9, a hole 88 extends through the front wall of the body and is coaxial with the longitudinal axis defined by the tubular side wall of the body. The hole 88 is stepped along the length thereof, presenting large diameter rear section adjacent the recess and a small diameter front section. A pair of longitudinally extending passages 90, 92 are also formed in the body, one of which extends through the front wall of the body and the other of which extends the length of the side wall. Thus, the passage 92 communicates with the interior of the body in front of the piston and the other passage 90 communicates with the interior of the body on the rear side of the piston.

Figure 7:
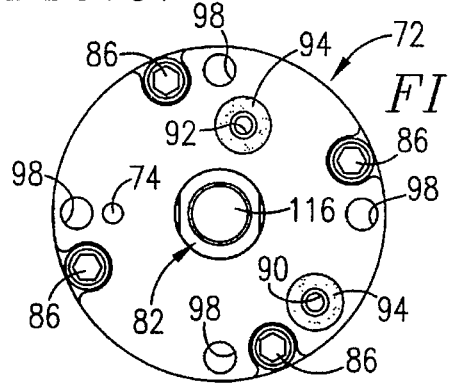
FIG. 7 is a front elevational view of the cylinder unit.

As depicted in FIG. 7, each passage 90, 92 includes a port on the exposed face of the front wall, and a pair of annular grooves are formed in the front wall around the ports. Each groove is sized to receive an O-ring 94 that provides a fluid tight seal between the front wall and the clamp plate 18. Returning to FIG. 6, a first set of four longitudinally extending holes 96 are provided in the side wall of the body 78 for receiving the fasteners 86 that hold the cap on the body, and a second set of four longitudinally extending holes 98 receive a securing means for securing the actuator within the recess of the top clamp plate.

Figure 5:
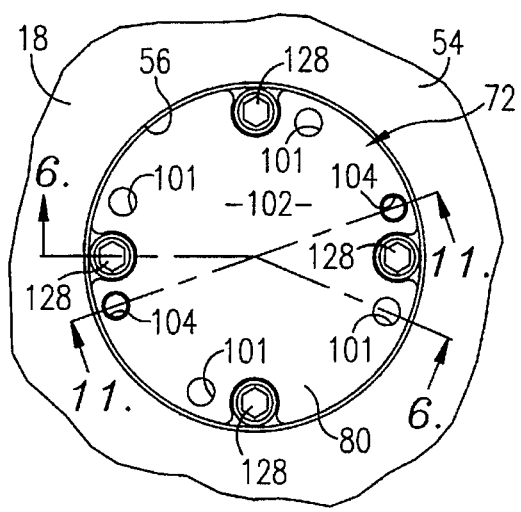
FIG. 5 is a rear elevational view of the cylinder unit positioned in the top clamp plate.
Figure 10:
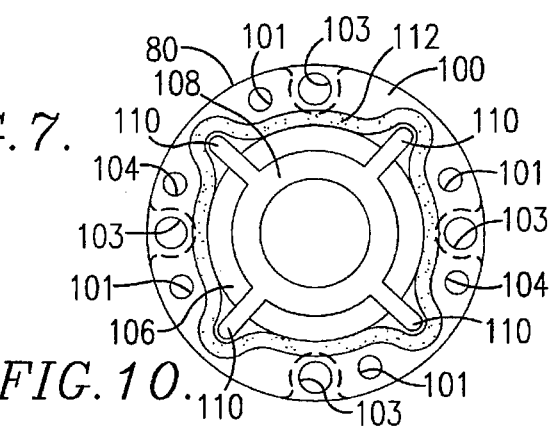
FIG. 10 is a front elevational view of a cap forming a part of the actuator, wherein the cap is removed from the assembly.

The cap 80 is a circular plate presenting opposed front and rear faces 100, 102, shown in FIGS. 10 and 5 respectively. As shown in FIG. 6, a first set of four longitudinally extending holes 101 extend through the cap in alignment with the holes 96 and a second set of four holes 103 extend through the cap at other spaced locations in alignment with the holes 98. The second set of holes are threaded to receive the fasteners 86 so that the cap is retained on the body when the fasteners are threaded through the body into the cap. The two sets of holes 1 01, 103 are shown in FIG. 6, and are spaced from each other around the circumference of the cap. Two additional threaded holes 104 are adapted to receive a tool that can be threaded into the holes and pulled to remove the actuator from the recess upon removal of the securing means. As shown in FIG. 11, the holes extend into the cap but not the body.

Turning to FIG. 10, the front face 100 of the cap includes a central circular portion 106 that protrudes inward from the remainder of the face. The central circular portion is of the same diameter as the inside of the tubular side wall of the body 78 and extends into the body upon assembly. An annular recess 108 is formed in the central circular portion and communicates with four radially extending recesses 110 formed in the cap. Each recess 110 is of a length sufficient to provide fluid communication between the annular recess 108 and the passage 90 extending through the side wall of the body. Thus, the cap can be positioned on the body with any of the radially extending recesses 110 in alignment with the passage 90, and fluid communication is provided between the passage and the interior of the body. A groove is formed in the inner face of the cap and circumscribes the central portion 106 and the recesses 108, 110 for receiving a seal 112 that provides a fluid tight connection between the cap and body.

The piston 82 is shown in FIG. 9, and includes a head 114 that is received within the body, and a rod 116 that is secured to the head and extends through the bore in the front end of the body. The head 114 is of a diameter substantially equal to but slightly less than the inner diameter of the side wall.

A circumferential groove is formed in the side of the head for receiving an O-ring 118 that seals the space between the head and the side wall. In this manner, two chambers 120, 122 are defined in the body 78, one on each side of the piston head. The rear chamber 120 communicates with the air passage 90 via the recesses 108, 110 in the cap, while the front chamber 122 communicates directly with the air passage 92. The rod 116 includes a reduced diameter forward end that is threaded to receive the retainer 84. An O-ring 124 is retained by a bushing 126 in the large diameter region of the bore for sealing the space between the body and piston.

The retainer 84 is tubular, presenting an outer diameter substantially equal to the outer diameter of the piston rod 116. The inner diameter of the retainer is stepped, presenting a rear threaded portion adapted for receipt on the threaded end of the rod, an intermediate portion sized for receipt of the head 76 of the valve gate pin 50, and a forward, small diameter portion presenting a diameter larger than the valve gate stem but smaller than the head 76. The retainer 84 holds the valve gate pin 50 on the piston so that the two move together as a unit.

As shown in FIG. 6, once the piston 82 has been assembled on the body 78, the cap 80 is placed over the rear end of the body and secured in place by the threaded fasteners 86 extending through the holes 96, 101 in the body and cap. The heads of the fasteners 86 are disposed within recesses formed in the front wall of the body so that they are concealed when the actuator is inserted into one of the recesses 56 of the top clamp plate. In this manner, it is not possible for an operator to inadvertently disassemble the actuator once it is positioned in the recess.

Threaded fasteners 128 are preferably used as the securing means for securing each actuator within one of the recesses. These fasteners 128 extend through the holes 98, 103 in the cap and body and are threaded into the holes 68 in the bottom wall of the recess. As shown in FIG. 5, the heads of the fasteners 128 are accessible when the actuator is secured in the recess. The two threaded holes 104 are also accessible so that an operator can thread an appropriate tool into them to pull the assembly from the recess once the fasteners 128 have been removed.

Returning to FIG. 6, the locating pin 74 extends from the front wall of the body and mates with the bore 70 in the bottom wall of the recess 56 when the passages 90, 92 are aligned with the ports 64, 66 of the passageways 60, 62, as illustrated in FIG. 9. Any conventional plumbing can be provided for selectively supplying air or another fluid to the passageways 60, 62 to control opening and closing of the nozzles, and does not form a part of the present invention.

If a seal or other component of an actuator in the mold assembly fails during use, the threaded fasteners 128 are removed from the bad actuator and it is pulled from the clamp plate 18. Because the valve gate pin 50 is secured to the piston 82, it also is removed from the mold assembly. Thereafter, the actuator is replaced by another that has already been tested for proper operation, and the new actuator is secured in the recess. It is not necessary to keep the entire machine off-line while seals are replaced or other repairs made. In addition, it is not necessary to install the actuator without first being able to test it for operability. Thus, a substantial savings in time is achieved.

Although the present invention has been described with reference to the preferred embodiment illustrated in the attached drawing figures, it is noted that substitutions may be made and equivalents employed herein without departing from the scope of the invention as recited in the claims.

What is claimed is:

1. A mold assembly for use in an injection molding machine having a pair of relatively movable platens and a means for supplying a moldable material to the mold assembly, the mold assembly comprising:

a cavity plate defining a cavity adapted to receive the moldable material;

a manifold interposed between the cavity plate and one of the platens for guiding a flow of the moldable material to the cavity plate;

a support plate positioned adjacent the manifold and including a rear face into which a cup-shaped recess extends, a front face opposite the rear face, and a bore extending between the from face and the recess;

a nozzle provided in fluid communication between the manifold and the cavity for directing the flow of material into the cavity;

a valve gate pin extending into the nozzle and being movable between a forward flow-blocking position and a rearward flow-permitting position;

an actuating means for moving the valve gate pin between tie flow-blocking and flow-permitting positions, the actuating means including a pneumatic actuator secured within the recess of the support plate, the actuator including a cylinder body presenting a front closed end and a rear open end, a movable piston extending through the closed end of the cylinder body and being connected to the valve gate pin, a cap closing off the open end of the cylinder body, and a fastener for holding the cap and cylinder body together as a unit; and a removable securing means extending through the actuator for securing the actuator within the recess of the support plate so that the actuator can be inserted into the recess and secured in place or pulled from the recess as an assembled unit.

2. A mold assembly as recited in claim 1, wherein the piston includes a head supported for reciprocating movement within the cylinder body, and the actuator includes a pair of air passages for introducing air into the body on either side of the piston head, the air passages each including an inlet port on the front end of the body.

3. A mold assembly as recited in claim 2, further comprising a sealing means for sealing the space between the front end of the cylinder body and the support plate around the periphery of each air passage inlet port, the sealing means being secured on the body so as to be capable of assembly prior to the actuator being positioned in the recess of the support plate.

4. A mold assembly as recited in claim 2, wherein the support plate includes a pair of air passageways for supplying air to each of the air passages of the actuator, the air passageways including supply ports opening into the recess and positioned for alignment with the inlet ponds when the actuator is positioned in the recess in a particular orientation, the mold assembly further comprising an alignment means for aligning the inlet ponds of the actuator with the supply ports when the actuator is inserted into the recess.

5. A mold assembly as recited in claim 1, further comprising a retaining element for retaining the valve gate pin on the piston, the retaining element being removable from the piston to permit disassembly of the valve gate pin from the actuator upon removal of the assembly from the recess.

6. A mold assembly as recited in claim 1, wherein the securing means is accessible from outside the recess when the actuator is positioned in the recess, and the fastener is concealed, the fastener being exposed for access upon removal of the actuator from the recess.

7. A mold assembly as recited in claim 1, wherein the cap includes a pair of threaded openings that are accessible when the actuator is positioned in the recess for permitting gripping and removal of the actuator from the recess.

8. A drop-in cylinder unit for use in a mold assembly including a cavity plate provided with a mold cavity, a clamp plate presenting a rear face into which a cup shaped recess extends, a front face opposite the rear face, and a bore extending between the front face and the recess, a nozzle positioned between the cavity plate and the front face of the clamp plate for directing a flow of moldable material into the cavity, and a valve gate pin extending into the nozzle for controlling the flow of material from the nozzle, the valve gate pin being movable between a forward flow-blocking position and a rearward flow-permitting position, the cylinder unit comprising: a cylinder body presenting a front closed end and a rear open end;

- a piston supported for movement within the cylinder body and extending through the closed end of the cylinder body, the valve gate pin being connected to the piston;
- a cap closing off the open end of the cylinder body;
- a removable fastener for holding the cap and cylinder body together as a unit; and
- a removable securing means extending through the cap and the cylinder body for securing the cylinder unit within the recess of the clamp plate so that the cylinder unit can be inserted into the recess and secured in place or pulled from the recess as an assembled unit.

9. A cylinder unit as recited in claim 8, wherein the piston includes a head supported for reciprocating movement within the cylinder body, and the cylinder unit further comprises a pair of air passages in fluid communication with the body on either side of the piston head, the air passages each including a port on the front end of the body.

10. A cylinder unit as recited in claim 9, further comprising a sealing means for sealing the space between the from end of the cylinder body and the damp plate around the periphery of each air passage port, the sealing means being secured on the cylinder body.

11. A cylinder unit as recited in claim 9, further comprising an alignment means for aligning the inlet of the actuator relative to the clamp plate when the cylinder unit is inserted into the recess.

12. A cylinder unit as recited in claim 8, further comprising a retaining element for retaining the valve gate pin on the piston, the retaining element being removable from the piston to permit disassembly of the valve gate pin from the cylinder unit upon removal of the unit from the recess.

13. A cylinder unit as recited in claim 8, wherein the securing means protrudes from the cap and is accessible when the cylinder unit is positioned in the recess, and the fastener protrudes from the front closed end of the cylinder body and is concealed when the cylinder unit is positioned in the recess.

14. A cylinder unit as recited in claim 8, wherein the cap includes a pair of threaded openings that are accessible when the cylinder unit is positioned in the recess for permitting gripping and removal of the cylinder unit from the recess.

\* \* \* \* \*